United States Patent
Blessing

(10) Patent No.: US 6,935,375 B2
(45) Date of Patent: Aug. 30, 2005

(54) MULTIWAY VALVE FOR SANITARY FIXTURES

(75) Inventor: Gerd Blessing, Obereschach (DE)

(73) Assignee: Hansgrohe AG, Schiltach (DE)

( * ) Notice: Subject to any disclaimer, the term of this patent is extended or adjusted under 35 U.S.C. 154(b) by 129 days.

(21) Appl. No.: 10/240,495

(22) PCT Filed: Apr. 3, 2001

(86) PCT No.: PCT/EP01/03745

§ 371 (c)(1),
(2), (4) Date: Jan. 10, 2003

(87) PCT Pub. No.: WO01/77550

PCT Pub. Date: Oct. 18, 2001

(65) Prior Publication Data

US 2003/0172979 A1 Sep. 18, 2003

(51) Int. Cl.[7] ............................................. F16K 11/16
(52) U.S. Cl. ................... 137/637; 137/636; 137/636.1; 137/801
(58) Field of Search ................ 137/801, 596, 137/596.2, 636, 636.1, 636.2, 637

(56) References Cited

U.S. PATENT DOCUMENTS

| | | | | |
|---|---|---|---|---|
| 763,889 A | * | 6/1904 | Hennebohle | 137/636.1 |
| 1,083,015 A | * | 12/1913 | Holzhausen | 137/636.1 |
| 1,690,767 A | * | 11/1928 | Bloch | 137/636.1 |
| 2,286,933 A | | 6/1942 | Royal | |
| 2,311,464 A | * | 2/1943 | Parker | 137/636.1 |
| 2,311,465 A | * | 2/1943 | Parker | 137/636.1 |
| 2,376,022 A | * | 5/1945 | Wolcott | 137/636.1 |
| 2,574,624 A | * | 11/1951 | Cochin | 137/636.1 |
| 4,296,773 A | | 10/1981 | Harshman et al. | |
| 4,517,935 A | * | 5/1985 | Pomfret | 137/637 |
| 5,937,905 A | | 8/1999 | Santos | |
| 6,742,542 B1 | * | 6/2004 | Dierks | 137/636.1 |

FOREIGN PATENT DOCUMENTS

| | | |
|---|---|---|
| DE | 25 58 796 | 7/1977 |
| DE | 36 37 470 | 5/1988 |
| DE | 37 07 885 | 9/1988 |
| DE | 34 13 552 | 10/1988 |
| DE | 35 09 602 | 11/1990 |
| DE | 41 18 540 | 12/1992 |
| DE | 93 14 443 | 1/1994 |
| DE | 44 20 036 | 10/1996 |
| DE | 195 09 661 | 2/1999 |
| EP | 0 266 613 | 5/1988 |

OTHER PUBLICATIONS

Copy of International Search Report.
Copy of German Search Report.

\* cited by examiner

Primary Examiner—Kevin Lee
(74) Attorney, Agent, or Firm—Duane Morris LLP

(57) ABSTRACT

A multiway valve, which is more particularly intended for a hand-operated shower, contains several individual valves, whose closure members are fitted to a tiltable element. By tilting the tiltable element, which is supported at one point, some of the plurality of individual valves can be opened and optionally also closed. The multiway valve can be housed in a confined space.

14 Claims, 2 Drawing Sheets though he/she is holding the shower handle with his/her hand. This can e.g. take place in the vicinity of the shower head or also on the shower handle with the aid of the thumb. With the switching valve it is then possible to switch different shower head jet types, for which purpose it has hitherto been necessary to act on the shower head using the second hand.

MULTIWAY VALVE FOR SANITARY FIXTURES

BACKGROUND OF THE INVENTION

The invention is directed at a multiway valve for sanitary fittings. The problem frequently arises with sanitary fittings that the water leaving a mixing valve must be switched to different outlets. Such multiway valves are frequently fitted into the fittings or are installed as separate fittings. They are e.g. used for switching over head showers, lateral showers or hand-operated showers. Frequently the known multiway valves take up a large amount of space.

The problem of the invention is to provide a multiway valve for sanitary fittings, which requires a limited amount of space and which can be easily operated.

SUMMARY OF THE INVENTION

To solve this problem the invention proposes a multiway valve having the features disclosed herein and defined in the claims, whose wording, like that of the abstract, is by reference made into part of the content of the present description.

The multiway valve proposed by the invention contains at least three individual valves between which switching is to take place. Each individual valve contains a valve seat and a closure member. All closure members are connected to the tiltable or tilting element, which produces a different valve situation in each tilting position. By tilting the tiltable element supported at one point it is consequently possible to bring about an opening or closing of the individual valves. It is possible that all the valve seats are located as openings in a disk or plate-like element, i.e. can be housed in juxtaposed, confined manner.

According to a further development of the invention, the multiway valve is operable in such a way that with the exception of the instant of switching, always only an individual valve is open, whereas the other valves are closed.

According to a further development of the invention the operating element is constructed in such a way that when operated it opens one individual valve and simultaneously closes another individual valve.

According to the invention it is sufficient for the multiway valve to contain a single operating element, which is then operated in different ways in order to open or close a specific individual valve.

However, according to a further development of the invention it is possible for the multiway valve to have a number of operating elements corresponding to the number of individual valves to be controlled. Each operating element can be associated with precisely one individual valve in such a way that an operation of the operating element leads to the opening of said individual valve.

It is possible for the operating element associated with a specific individual valve to be constructed in such a way that it opens said individual valve, closes the previously opened individual valve and leaves closed the other individual valve previously closed.

According to a further development of the invention the tiltable element is in the form of a plate or disk shaped like a regular polygon, particularly in the form of an equilateral triangle when there are three individual valves.

According to the invention the closure members or closing elements of the individual valves in the vicinity of the angles of the tiltable element are connected thereto. This makes it possible to effectively obtain the necessary stroke for opening and closing the individual valves.

According to a further development the closure members of the individual valves are also connected to the tiltable element in the vicinity of the centres of the sides. This also makes it possible to obtain a uniform stroke for all, the individual valves.

According to the invention it is possible for several operating elements to act on the tiltable element in the vicinity of the centres of its sides.

However, it is also possible and is proposed by the invention that the operating elements act on the tiltable element in the vicinity of its angles.

According to the invention the operating elements are pushbuttons, which can be particularly easily and obviously operated. For opening a specific individual valve the user only has to depress the corresponding pushbutton.

A particularly important application for the multiway valve proposed by the invention is to install it in a hand-operated shower and to position the operating elements in such a way that they can be operated by the user with the hand holding the shower handle. This can e.g. take place in the vicinity of the shower head or also on the shower handle with the aid of the thumb. With the switching valve it is then possible to switch different shower head jet types, for which purpose it has hitherto been necessary to act on the shower head using the second hand.

BRIEF DESCRIPTION OF THE DRAWINGS

Further features, details and advantages of the invention can be gathered from the following description of a preferred embodiment and the attached drawings, wherein show.

DETAILED DESCRIPTION OF THE PREFERRED EMBODIMENT

Figure 1:
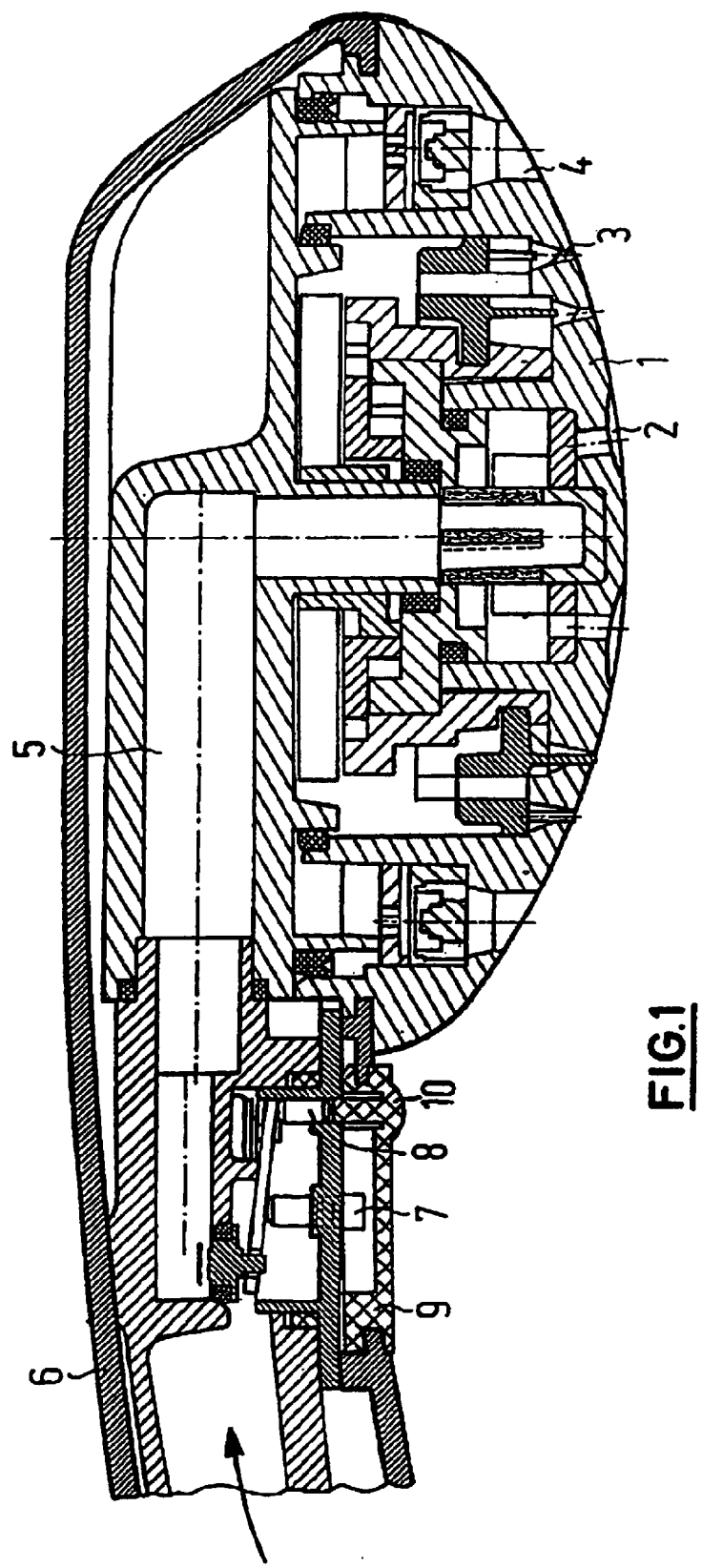
FIG. 1 A section through a shower head with several separate jet guides.

FIG. 1 is a longitudinal section through a shower head with a multiway valve according to the invention. The shower head contains a jet disk 1, with three different types of jet exit orifices 2, 3, 4. To the individual types of jet exit orifices 2, 3, 4 lead separate water ducts, whereof only a single water duct 5 is shown in section in FIG. 1. The water duct 5 shown leads to a device with which massaging jets can be discharged through the jet exit orifices 2 and for this purpose the shower head contains a turbine.

In an area surrounding the centre of the jet disk are provided the jet exit orifices 3 for a relatively hard water jet, whereas in a further outwardly located area it is possible to discharge aerated water jets through the exit orifices 4.

Directly upstream of the shower head and at the end of the only partly shown handle 6 is provided a switching device, in order to switch the water flowing through the handle to the different jet ducts. The switching device is operated with the aid of individual pushbuttons 7, 8, which are covered and therefore sealed to the outside by an elastic diaphragm 9. By pressing on the pushbuttons more easily found as a result of the elevations 10 it is possible to operate the switching device, which represents a multiway valve. In the represented embodiment the multiway valve is designed in such a way that in each case one individual valve can be opened, which then passes the inflowing water into one of three water ducts.

Figure 3:
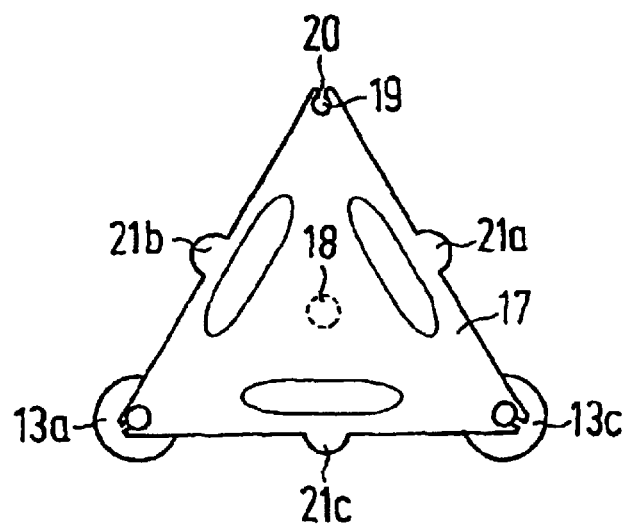
FIG. 3 Diagrammatically a plan view of components of the multiway valve proposed by the invention.
Figure 2:
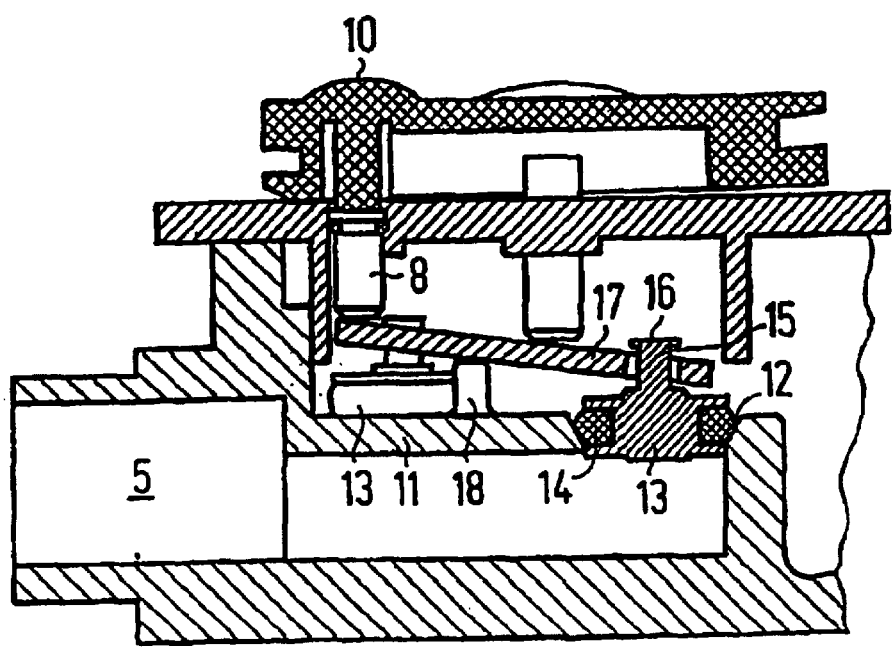
FIG. 2 On a larger scale a section through the multiway valve according to the invention fitted in the shower head.

Details of this multiway valve are shown in FIGS. 2 and 3. The multiway valve contains a plate 11 in which there are three openings 12 with a slightly inclined edge. Each opening 12 leads into a water duct 5, which then passes into the shower head. Each opening 12 forms a valve seat. For cooperating with the openings 12 are provided closing elements or closure members 1,3 which have a circumferential O-ring 14, which can rest on the valve seat 12. On the side upstream of the valve seat 12 the closure members 13 contain a lug 15 with a widened head 16. With said lug 15 the closure members 13 are fixed in a tilting or tiltable element 17, which is supported in punctiform manner roughly in its centre by a stud 18. In the position shown in FIG. 2 the valve seat 12, which is in the sectional plane, is closed by the closing member 13, whereas a valve seat located behind the drawing plane is opened. This is apparent from the closure member 13 to the left, which is consequently extracted from its associated opening. In order to open the individual valve formed by the valve seat 12 and the closure member 13 and located in the sectional plane, the user presses on the elevation 10 located in the sectional plane. As a result the corresponding pushbutton 8 is moved to the left and tilts the tiltable element 17 about a line linking the punctiform support and a second, closed individual valve. In the represented position the closure member 13 to the left is moved downwards in order to close the associated individual valve. Simultaneously the individual valve located in the sectional plane is open. This can also be expressed in such a way that the operating element represented by the pushbutton 8 is used for opening the individual valve located in the sectional plane. An individual pushbutton is provided for each individual valve.

The principle on which the multiway valve according to the invention is based is best described relative to FIG. 3. In the represented embodiment, the three intake valves are located in one plane and all the closure members 13 and all the valve seats 12 have an identical construction. The tiltable element 17 is shaped like an equilateral triangle, to whose angles are fixed the closure members 13. In FIG. 3 the closure member 13 is omitted from the top of tiltable element 17. From the angle a slot 20 passes into the triangle, which is widened there to form a round opening 19. The closure member 13 is pressed from the angle through the slot 20 with a lug 15 and then remains suspended in the opening 19. The slot 20 is somewhat narrower than the diameter of the lug 15. In this way in all three angles of the tiltable element 17 is in each case retained one closure member 13. The closure members have a certain clearance in order to compensate an angle present on tilting the tiltable element 17. However, they are connected to the tiltable element 17 in the push direction and pull direction, i.e. perpendicular to the drawing plane.

Roughly in the centre of the side of the tiltable element 17 is in each case formed a widening 21, which forms an engagement point for the pushbutton 8. Therefore the pushbuttons 8 act on the tiltable element 17 roughly perpendicular to the plane thereof. However, they are not connected to the tiltable element 17.

In the vicinity of its centre, the tiltable element 17 is supported by the stud 18. This support is substantially punctiform.

For the following discussion a starting situation is assumed in which the closure members 13a and 13c are located in the valve seats 12 and the associated individual valves are closed. In this case the individual valve at the top in FIG. 3 is opened, which results from the geometry, namely the height of the stud 18. If a user now presses on the pushbutton associated with the widening 21, the tiltable element 17 is tilted about an axis linking the support point 18 with the closure member 13c. This means that the previously opened individual valve, at the top in FIG. 3, is closed and the left-hand individual valve in FIG. 3, represented by the closure member 13a, is opened. The pushbutton acting in the centre of one side of the equilateral triangle is consequently associated with the individual valve located at the opposite apex of the triangle.

What is claimed is:

1. A multiway valve for sanitary fittings, comprising:
   at least three individual valves, which in each case have a valve seat and a closure member movable with respect to the valve seat;
   a tiltable element having a circumference at which the closure members of the individual valves are connected for the operation of said valves, wherein the tiltable element is supported in punctiform manner on a tilting point at a central area of the tiltable element; and,
   at least one operating element provided for tilting the tiltable element and thereby operating the individual valves.

2. The multiway valve according to claim 1, wherein the multiway valve is operable in such a way that only one of said at least three individual valves is open.

3. The multiway valve according to claim 1, wherein the operating element is constructed in such a way that when operated it opens one of said at least three individual valves and closes another of said individual valves.

4. The multiway according to claim 1, comprising one said operating element for each of said at least three individual valves.

5. The multiway valve according to claim 1, wherein the operating element associated with a specific one of the individual valves is constructed in such a way that it opens said specific individual valve, closes a previously opened other one of the individual valves and keeps closed a previously closed further one of the individual valves.

6. The multiway valve according to claim 1, wherein the tiltable element comprises a regular polygon.

7. The multiway valve according to claim 1, wherein the tiltable element comprises a polygon and the closure members of the individual valves are connected to the tiltable element in a vicinity of the tiltable element.

8. The multiway valve according to claim 7, wherein the closure members of the individual valves are connected to the tiltable element in a region of centers of sides of the polygon.

9. The multiway valve according to claim 1, wherein the tiltable element comprises a polygon and the operating elements act on the tiltable element in a region of centres of sides of the polygon.

10. The multiway valve according to claim 1, wherein the tiltable element comprises a polygon and the operating elements act on the tiltable element in a region of angles of the polygon.

11. The multiway valve according to claim 1, wherein the at least one said operating element comprises at least one pushbutton.

12. The multiway valve according to claim 1, wherein the multiway valve is installed in a hand-operated shower and a plurality of said operating elements are located in such a way that they can be operated by a user with a same hand holding said hand-operated shower.

13. The multiway valve according to claim 1, wherein the tiltable element comprises an equilateral triangle, tiltable in selected directions on the tilting point to operate three corresponding said individual valves.

14. The multiway valve according to claim 1 comprising a plurality of said operating elements of which each includes a pushbutton.

\* \* \* \* \*